T. A. EDISON.
TELEGRAPHIC ALARM AND SIGNAL APPARATUS.

No. 186,548. Patented Jan. 23, 1877.

2 Sheets—Sheet 1.

Witnesses.
Chas. H. Smith
Harold Serrell

Inventor,
Thomas A. Edison.
per Lemuel W. Serrell
Atty

2 Sheets—Sheet 2.

T. A. EDISON.
TELEGRAPHIC ALARM AND SIGNAL APPARATUS.

No. 186,548. Patented Jan. 23, 1877.

Witnesses
Chas H. Smith
D. P. Cowl.

Inventor
Thomas A. Edison
per Lemuel W. Serrell
Atty.

UNITED STATES PATENT OFFICE.

THOMAS A. EDISON, OF MENLO PARK, NEW JERSEY, ASSIGNOR TO THE DOMESTIC TELEGRAPH COMPANY, OF NEW YORK.

IMPROVEMENT IN TELEGRAPHIC ALARM AND SIGNAL APPARATUS.

Specification forming part of Letters Patent No. 186,548, dated January 23, 1877; application filed May 18, 1876.

*To all whom it may concern:*

Be it known that I, THOMAS A. EDISON, of Menlo Park, in the county of Middlesex and State of New Jersey, have invented an Improvement in District and Fire-Alarm Telegraphs, of which the following is a specification:

The object of this invention is to provide a cheap and reliable alarm, adapted to small cities and towns, for giving fire-alarms or other signals.

I make use of a central station, with one or more lines running to the respective signal-instruments, which may be similar to those shown in Letters Patent No. 169,972, and are placed in a branch running to earth. When the signal-instrument is operated an alarm is given at the central station to call attention, a record is made of the signal upon chemical paper, and the operator, by a revolving circuit-breaker, rings a bell or bells in the engine-house, or wherever the alarm has to be sounded, giving the location by the number of taps of the bell, to show where the fire is, or the call that requires to be answered.

Figure 1:
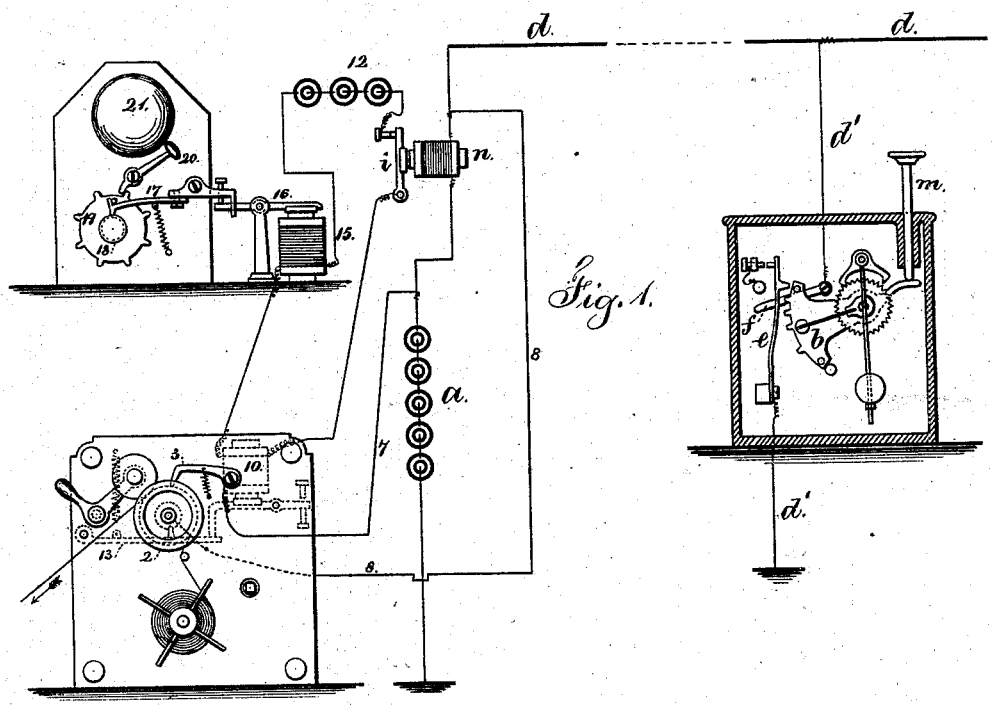
Figure 2:
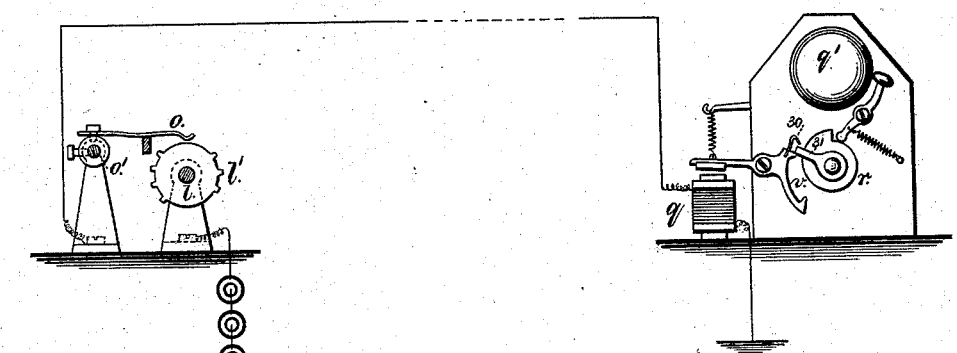
Figure 3:
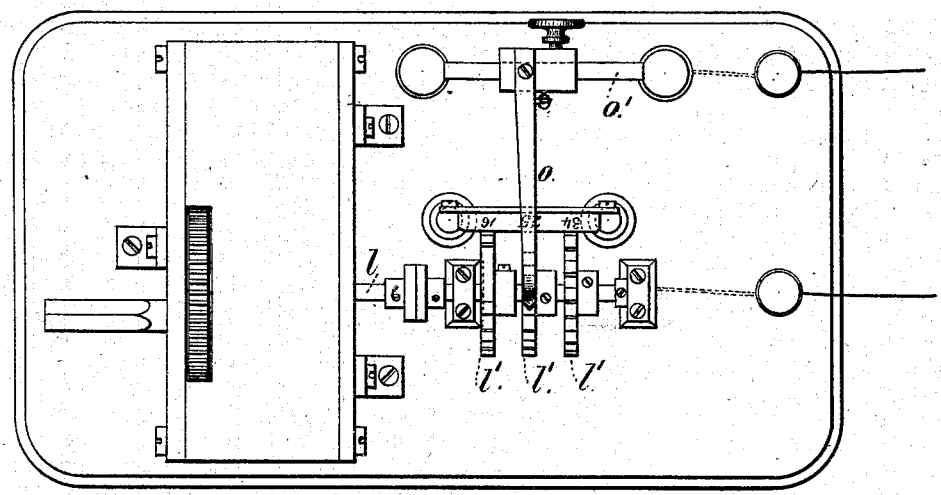

In the drawing, Figure 1 is a diagram illustrating the circuit-connections from a central station to one distant signal-box; and Fig. 2 shows the circuits from the central station to the engine-house or other location to which the signal is to be sent; and Fig. 3 is a plan of the instrument employed to signal such engine-houses or other station.

The main battery $a$ is connected to the earth and to the line-wire $d$, and from this one or more branches, $d'$, pass to earth, and in each such branch there is a signaling-instrument, adapted to be operated for sending pulsations denoting numbers, and by operating this instrument the circuit is closed and again broken when the signal has been given. An instrument of this general character is shown in the Patent No. 169,972, with the exception that the segment $b$ has teeth upon it that operate the circuit-closing spring $e$, and when the segment is being turned by pushing in the rod $m$ the switch $f$ is moved to close the branch circuit to the spring $e$, and when the segment falls again, giving the pulsations through the circuit-closer $e$, the switch $f$ is moved back during the latter part of the movement of $b$ and breaks the circuit of $e$, so that one set of signals only will be given. The signal is received at the central station on chemical paper, the circuit passing, by 7, from the main line through the stylus 3, and drum 2, and back, by 8, to the line at the other side of the electro-magnet $n$. By this arrangement the resistance of $n$ causes a portion of the current to pass through the chemical paper, and the discharge from the said magnet $n$, when the circuit is broken, sets up a current of opposite polarity, to render the marks on the chemical paper sharp and distinct. The chemically-prepared paper is on a reel, which may be placed in a case, so as to keep it moist. The electro-magnet $n$ operates an armature, $i$, that is in a local circuit from the battery 12, and in this is an electro-magnet, 10, that operates the trip 13 of the clock-work used to revolve the drum 2 and move the chemical paper, so that as soon as the circuit of $n$ is closed and its armature attracted the local circuit from 12 is broken, the armature of 10 falls back and releases the trip or stop of the clock-work, and the paper is moved by the drum to receive and record the pulsations of the signal. The magnet 15 in the circuit from 12 operates the trembler 16, which is an armature-lever acting upon a dog, 17, in the screw 18 upon the shaft of spur-wheel 19, operating the hammer 20 of a bell, 21. The wheel 19 and screw 18 are revolved by clock-work for ringing the bell, and this ringing will continue until the circuit through 15 remains closed long enough to allow the screw to move the dog 17 endwise of the screw until it arrests by a stop the movement of the clock-work. The alarm-bell 21 is rung, as aforesaid, as soon as the circuit of $d$ is closed, at the distant station, so as to call the attention of the attendant to the message received upon the chemical paper.

At the central station the attendant has a clock-movement with a shaft, $l$, upon which are break-wheels $l'$, with conducting peripheral projections, and there are as many break-wheels as there are signal-stations or characters of signals to be received at the central office. There is also a contact-spring, $o$, adjustable upon a rod, $o'$, so that it may be moved along to come in contact with either of the break-wheels. As soon as a signal is received the attendant moves the spring *o* along into contact with the wheel corresponding to the signal received. A battery is in circuit with this wheel *l'*, and the spring *o* leads to the line-wire that runs to an engine-house or other place where the signal is to be given, and there energizes the electro-magnet *q* and gives pulsations or taps upon a bell, *q'*, corresponding, as to length of duration and intermediate pauses, with the break-wheel *l'*, with which the spring *o* is in contact. I prefer and use a cam, *r*, that is revolved by clock-work and moves the bell-hammer, and the escapement *v* controls the revolution of this cam, such escapement being connected with the armature of the electro-magnet, and having a spring-finger, 30, at one end to arrest the arm 31 on the cam-shaft, and thereby prevent a sudden stoppage of the momentum of the cam and gearing. This spring yields as the arm passes it, so as to prevent concussion or rebound, and as the pallets of the escapement are moved by the electro-magnets the cam of the bell is allowed to revolve and ring the bell, giving the proper number of taps, according to the number of the station from which the alarm proceeds.

The solution used for moistening the chemical paper is preferably composed of a solution of pyrogallic acid, chloride of sodium, or other conducting substance, and a salt of strontia.

I claim as my invention—

1. The segment *b*, with points upon its edge, in combination with the circuit-closing spring *e* and switch *f*, operated by the movement of the segment, as set forth.

2. The receiving-instrument, provided with a trip for the actuating-gearing, in combination with the electro-magnet to move the trip and the roller 2 and stylus 3, substantially as set forth.

3. The local circuit electro-magnets *n* and 15, in combination with the call-bell 21, trembler 16, and chemical recording-instrument, substantially as set forth.

4. The transmitting-instrument, provided with a revolving shaft and circuit-closing wheels corresponding to the signals of the various signaling-instruments, and a movable contact-spring, arranged and operating substantially as set forth.

5. The bell signaling-instrument, constructed with a revolving cam to operate the hammer, a spring-stop upon the escapement, and an electro-magnet to operate the escapement, substantially as set forth.

Signed by me this 9th day of May, A. D. 1876.

THOS. A. EDISON.

Witnesses:
J. D. RUSS,
CHAS. BATCHELOR.